United States Patent
Kim et al.

(10) Patent No.: US 9,335,417 B2
(45) Date of Patent: May 10, 2016

(54) SATELLITE RECEIVER AND SYSTEM EMPLOYING SERVER FOR IDENTIFYING SATELLITE STATE

(71) Applicant: Samsung Electronics Co., Ltd., Gyeonggi-do (KR)

(72) Inventors: Woo-Young Kim, Seoul (KR); Do-Hyoung Chung, Gyeonggi-do (KR); Seung-Yoon Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 726 days.

(21) Appl. No.: 13/728,239

(22) Filed: Dec. 27, 2012

(65) Prior Publication Data

US 2013/0194132 A1  Aug. 1, 2013

(30) Foreign Application Priority Data

Jan. 26, 2012  (KR) ........................ 10-2012-0007714

(51) Int. Cl.
*G01S 19/08* (2010.01)
*G01S 19/25* (2010.01)
*G01S 19/20* (2010.01)

(52) U.S. Cl.
CPC ................. *G01S 19/25* (2013.01); *G01S 19/08* (2013.01); *G01S 19/20* (2013.01)

(58) Field of Classification Search
CPC ........... H01Q 3/00; G01S 19/08; G01S 19/06; G01S 19/20; G01S 19/25; G01S 19/05
USPC .................... 342/368, 357.45, 357.43, 357.58
See application file for complete search history.

(56) References Cited

U.S. PATENT DOCUMENTS

| | | | |
|---|---|---|---|
| 2005/0104772 A1 | 5/2005 | Diggelen et al. | |
| 2006/0250302 A1* | 11/2006 | Park | G01S 5/0289 342/357.43 |
| 2008/0018527 A1* | 1/2008 | LaMance | G01S 19/05 342/357.66 |
| 2009/0066565 A1* | 3/2009 | Tsai | G01S 19/05 342/357.42 |
| 2009/0128406 A1 | 5/2009 | Alanen et al. | |
| 2010/0134353 A1* | 6/2010 | van Diggelen | G01S 19/27 342/357.66 |
| 2010/0156714 A1 | 6/2010 | van Diggelen et al. | |
| 2011/0254730 A1* | 10/2011 | McBurney | G01S 19/03 342/357.4 |
| 2012/0206298 A1 | 8/2012 | Alanen et al. | |

FOREIGN PATENT DOCUMENTS

| | | |
|---|---|---|
| CN | 1902504 A | 1/2007 |
| CN | 101389974 A | 3/2009 |
| EP | 1989565 B1 | 11/2008 |
| JP | 2007-511766 A | 5/2007 |
| JP | 2009-528528 A | 8/2009 |

(Continued)

*Primary Examiner* — Harry Liu
(74) *Attorney, Agent, or Firm* — Cha & Reiter, LLC.

(57) ABSTRACT

Provided is a system and method for transmitting a satellite state to a satellite receiver to determine use or non-use of a satellite signal in positioning estimation. A satellite navigation system includes at least one satellite, a satellite control center for controlling the at least one satellite, and a server. The server transmits satellite state information about the at least one satellite identified through the satellite control center to the satellite receiver. The satellite receiver restricts the use of the satellite signal for positioning estimation when the satellite state is identified as erroneous.

8 Claims, 11 Drawing Sheets

(56) References Cited

FOREIGN PATENT DOCUMENTS

| KR | 10-2006-0135650 A | 12/2006 |
| KR | 2006-0135650 A | 12/2006 |
| KR | 10-2011-0056038 A | 5/2011 |
| KR | 2011-0056038 A | 5/2011 |

\* cited by examiner

SATELLITE RECEIVER AND SYSTEM EMPLOYING SERVER FOR IDENTIFYING SATELLITE STATE

CLAIM OF PRIORITY

This application claims priority under 35 U.S.C. §119 to an application filed in the Korean Intellectual Property Office on Jan. 26, 2012 and assigned Serial No. 10-2012-0007714, the contents of which are incorporated herein by reference.

BACKGROUND

1. Technical Field

This disclosure relates generally to a satellite receiver and a satellite navigation system in which satellite state information is used to identify an erroneous satellite.

2. Description of the Related Art

A satellite navigation system (e.g., Global Navigation Satellite System (GNSS)) is a system that estimates the position of a target by using at least one satellite and a satellite receiver. For example, the satellite receiver estimates its position by using satellite navigation information extracted from a satellite signal received from a satellite.

In order to reduce a position estimation error of the satellite receiver, the satellite navigation system transmits satellite state information to the satellite receiver.

FIG. 1 illustrates a configuration for identifying satellite state information in a satellite navigation system according to the related art. The satellite navigation system includes a satellite control center 100, a satellite 110, and a satellite receiver 120. When an error occurs in the satellite 110, the satellite control center 100 transmits "unhealthy" satellite state information to the satellite 110, which is an indication that the satellite is not working properly. Satellite 110 retransmits the satellite state information, received from the satellite control center 100, to the satellite receiver 120.

Based on the satellite state information received from the satellite 110, the satellite receiver 120 determines whether to use a signal of the satellite 110 for position estimation. That is, when the satellite state is unhealthy, the satellite receiver 120 does not use a satellite signal of the satellite 110 for position estimation.

As described above, the satellite navigation system transmits satellite state information to the satellite receiver 120 through the satellite 110 in order prevent a position estimation error from occurring in the satellite receiver 120 due to the erroneous satellite.

However, a position estimation error of the satellite receiver 120 may increase due to a time delay in identifying an error of the satellite 110. The time delay occurs between the time the satellite control center 100 identifies the error and the time that the satellite receiver 120 receives the satellite state information. For example, when an error occurs in the satellite 110, the satellite receiver 120 is unaware of the error until it receives satellite state information from the satellite 110, and, in the meantime, assumes the satellite 110 is operating normally. Accordingly, a position estimation error may occur in the satellite receiver 120 because the satellite receiver 120 performs position estimation by using a satellite signal received from the erroneous satellite 110, before identifying unhealthy state information of the satellite 110.

SUMMARY

An aspect of the present disclosure is to provide an apparatus and method for reducing a position estimation error in a satellite receiver.

Another aspect is to provide a system and method for identifying satellite state information in a satellite receiver.

Another aspect is to provide a system and method for reducing a delay in the identification of satellite state information in a satellite receiver.

Another aspect is to provide a system and method for reducing a delay in the identification of satellite state information in a satellite receiver by using a server to monitor satellite states in a satellite navigation system.

According to an illustrative embodiment, a method for identifying a satellite state in a satellite receiver is provided. The satellite receiver receives satellite state information about at least one satellite from a server, which has obtained the satellite state information from a satellite control center. The satellite receiver restricts the use of a satellite signal received from the at least one satellite when the at least one satellite is determined to be erroneous based on the received state information.

A method for transmitting satellite state information in a server includes: identifying satellite state information about at least one satellite through a satellite control center; and transmitting the satellite state information about the at least one satellite to a satellite receiver.

In certain embodiments, the satellite receiver first determines whether an error occurs in the satellite by performing RAIM (Receiver Autonomous Integrity Monitoring) on the satellite signal received from the satellite. If the RAIM indicates the satellite is erroneous, the satellite receiver initially restricts the satellite signal and requests state information for that satellite from the monitoring server. If the monitoring server confirms the erroneous state, the satellite signal remains restricted. If the server contradicts the erroneous state determination, the restriction placed on the satellite signal is lifted.

At least some embodiments exhibit the following advantage: by receiving satellite state information from a server rather than from a satellite, delays in obtaining the relevant information can be reduced, thereby minimizing positional estimation errors.

BRIEF DESCRIPTION OF THE DRAWINGS

The above and other aspects, features and advantages of the present invention will become more apparent from the following detailed description when taken in conjunction with the accompanying drawings, in which like reference numerals identify like elements or features, in which.

DETAILED DESCRIPTION OF EXEMPLARY EMBODIMENTS

Exemplary embodiments of the present invention will be described herein below with reference to the accompanying drawings. In the following description, detailed descriptions of well-known functions or configurations will be omitted since they would unnecessarily obscure the subject matter of the present invention. Also, the terms used herein may be defined according to functions of the present invention. Thus, the terms may vary depending on users' or operators' intentions or practices. Therefore, the terms used herein should be understood based on the descriptions made herein.

Hereinafter, a description will be given of a scheme for identifying a satellite state in a satellite receiver according to the present invention.

In the following description, examples of a satellite navigation system (e.g., GNSS) include GPS (Global Positioning System), GLONASS (Global Orbiting Navigation Satellite System), Galileo Satellite Navigation System, and COMPASS (Compass Navigation System).

In the following description, examples of a satellite receiver that can operate in accordance with the invention include but are not limited to a mobile terminal, a personal digital assistant (PDA), a laptop computer, a desktop computer, a smart phone, a netbook, a mobile internet device (MID), an ultra mobile personal computer (UMPC), a tablet PC, a navigation device, an MP3 player, and a smart television (TV) that can receive a satellite signal.

Figure 1:
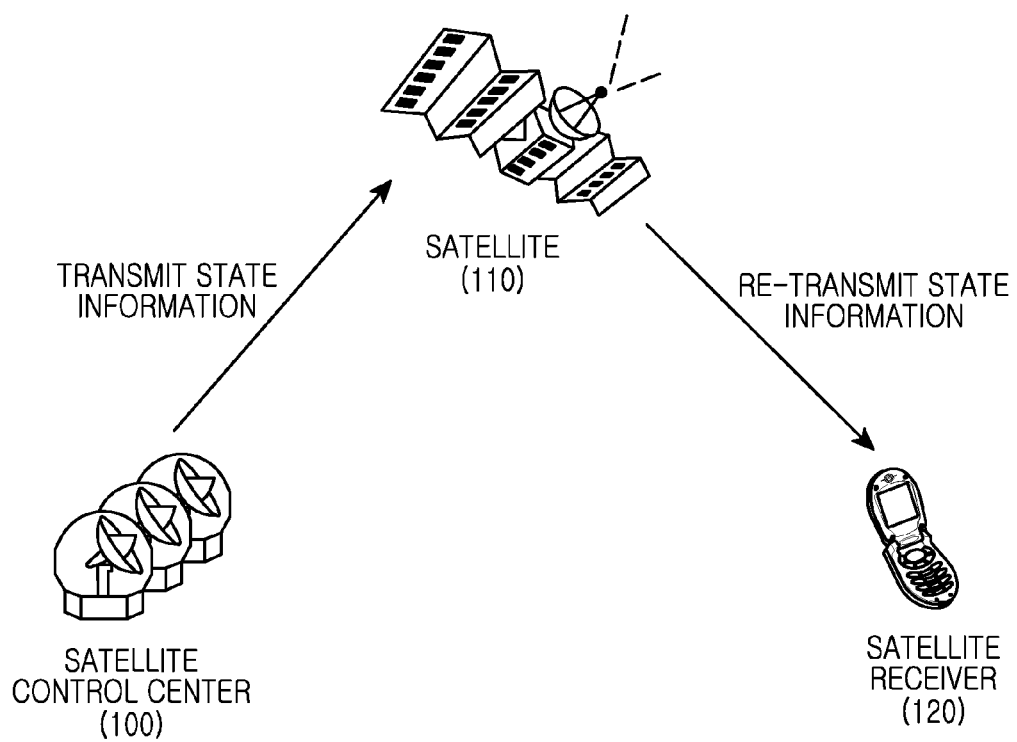
FIG. 1 is a diagram illustrating a configuration for identifying satellite state information in a satellite navigation system according to the related art.
Figure 2:
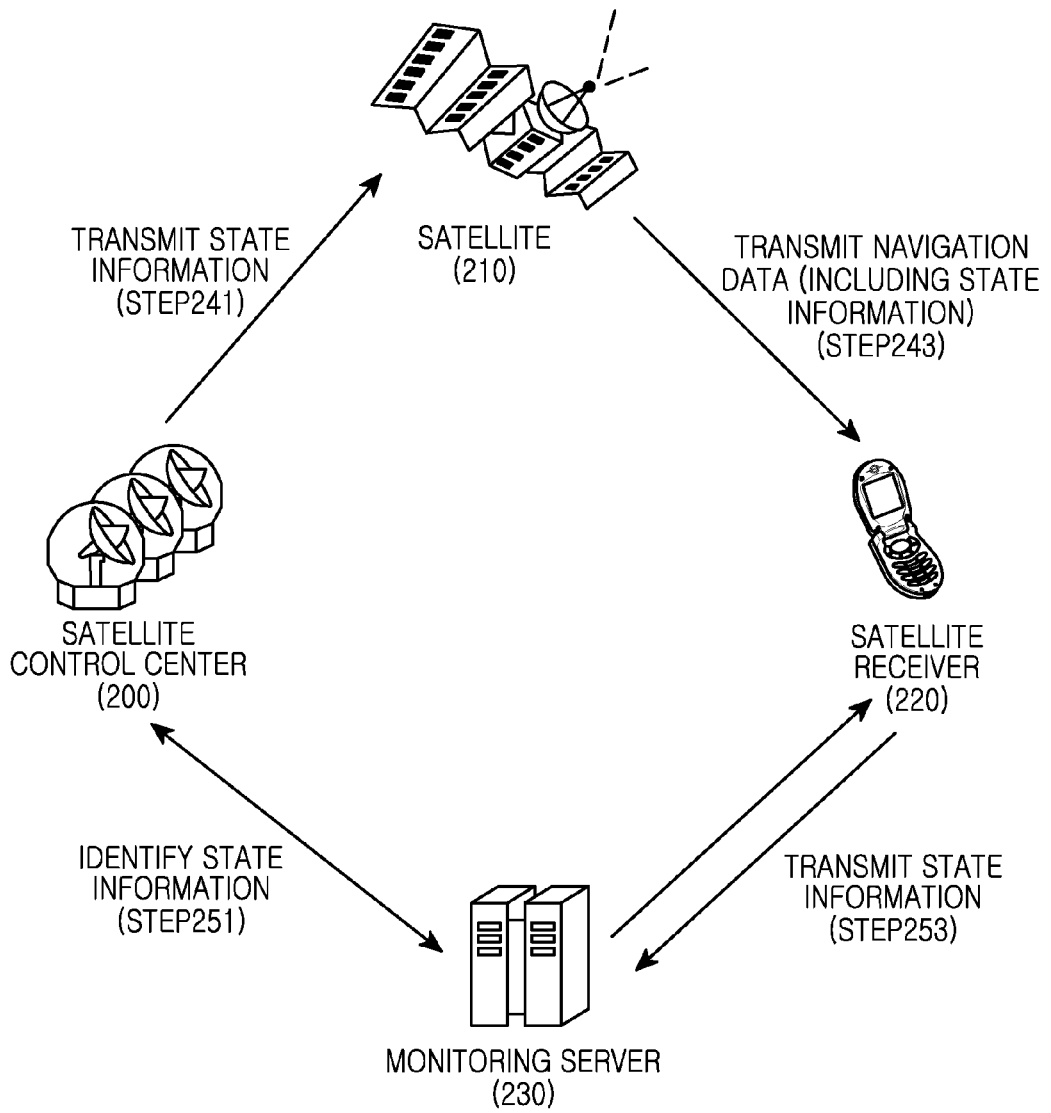
FIG. 2 is a diagram illustrating a configuration and method for identifying satellite state information in a satellite navigation system according to the present invention.

FIG. 2 illustrates a configuration and method for identifying satellite state information in a satellite navigation system according to an embodiment of the present invention. As illustrated, an example satellite navigation system includes a satellite control center 200, a satellite 210, a satellite receiver 220, and a monitoring server 230. The satellite control center 200 controls an overall operation of at least one satellite 210 included in the satellite navigation system.

Also, the satellite control center 200 identifies an operation state of the satellite 210. When an error occurs in the satellite 210, the satellite control center 200 transmits unhealthy satellite state information to the satellite 210 (step 241). On the other hand, when an error does not occur in the satellite 210, the satellite control center 210 transmits healthy satellite state information to the satellite 210.

Under the control of the satellite control center 200, the satellite 210 transmits navigation data to the satellite receiver 220 (step 243). In this case, the satellite 210 transmits the satellite state information, received from the satellite control center 200, to the satellite receiver 220. For example, the satellite 210 transmits the navigation data including the satellite state information, received from the satellite control center 200, to the satellite receiver 220.

The monitoring server 230 monitors a state of the satellite 210 through the satellite control center 200 (step 251). For example, the satellite control center 200 periodically posts satellite state information on a homepage. Accordingly, the monitoring server 230 periodically identifies the satellite state information posted by the satellite control center 200. As another example, the monitoring server 230 may periodically receive satellite state information from the satellite control center 200. As yet another example, the satellite state information may be periodically provided by the satellite control center 200 upon request by the monitoring server 230. Alternatively, the satellite control center 200 updates the state information provided to the monitoring server 230 only when a state change occurs for any satellite or for any relevant satellite.

The monitoring server 230 transmits state information of the satellite 210, identified through the satellite control center 200, to the satellite receiver 220 (step 253). For example, when the state of the satellite 210 changes, the monitoring server 230 transmits state information of the satellite 210 to the satellite receiver 220. As another example, the monitoring server 230 may periodically transmit state information of the satellite 210 to the satellite receiver 220.

The satellite receiver 220 performs position estimation by using navigation data received from the satellite 210. In this case, based on satellite state information received from at least one of the satellite 210 and the monitoring server 230, the satellite receiver 220 determines whether to use a signal of the satellite 210 for position estimation. For example, when receiving satellite state information from the satellite 210, the satellite receiver 220 determines whether to use a signal of the satellite 210 for position estimation, based on the satellite state information received from the satellite 210. As another example, when receiving satellite state information from the monitoring server 230, the satellite receiver 220 determines whether to use a signal of the satellite 210 for position estimation, based on the satellite state information received from the monitoring server 230. As yet another example, when identifying the occurrence of an error in the satellite 210 from satellite state information received from the satellite 210, the satellite receiver 220 may request a state of the satellite 210 from the monitoring server 230 to verify the state of the satellite 210.

When identifying the occurrence of an error in the satellite 210, the satellite receiver 220 does not use a satellite signal of the satellite 210 for position estimation.

Figure 3:
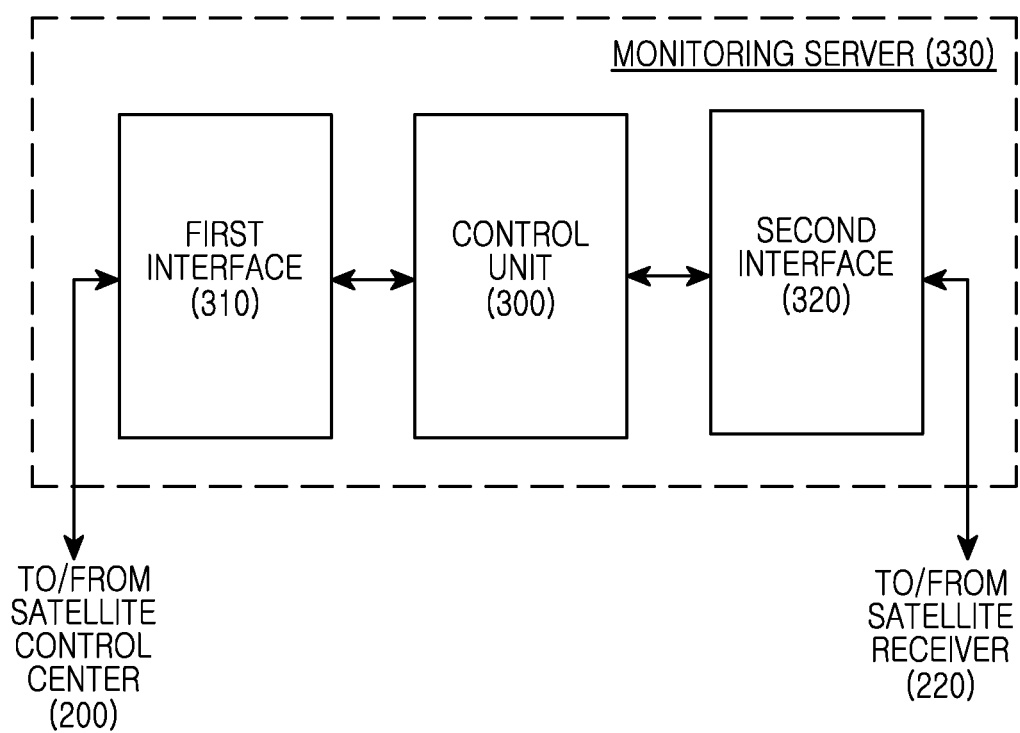
FIG. 3 is a diagram illustrating a block configuration of a monitoring server for identifying a satellite state according to the present invention.

FIG. 3 illustrates a functional block configuration of a monitoring server for identifying a satellite state according to an embodiment. The monitoring server 330 (an embodiment of server 230) includes a control unit 300, a first interface 310, and a second interface 320.

The first interface 310 processes signals communicated between the control unit 300 and the satellite control center 200. The second interface 320 processes signals communicated between the control unit 300 and the satellite receiver 220.

The control unit 300 controls an overall operation of the monitoring server 230. Specifically, the control unit 300 identifies a state of the satellite 210 from the satellite control center 200 through the first interface 310. The state information can be received periodically, or upon request by the control unit, or only when a state change occurs. For example, the control unit 300 periodically identifies satellite state information posted by the satellite control center 200 through the first interface 310. As another example, the control unit 300 may periodically receive satellite state information from the satellite control center 200 through the first interface 310. As yet another example, the control unit 300 may request and receive satellite state information from the satellite control center 200 through the first interface 310.

The control unit 300 transmits state information of the satellite 210, identified from the satellite control center 200, to the satellite receiver 220 through the second interface 320. For example, the control unit 300 may periodically transmit state information of the satellite 210 to the satellite receiver 220. As another example, when the state of the satellite 210 changes, the control unit 300 may transmit state information of the satellite 210 to the satellite receiver 220.

Also, when receiving erroneous satellite information from the satellite receiver 220 through the second interface 320, the control unit 300 identifies a state of at least one satellite corresponding to the satellite information from the satellite control center 200 through the first interface 310. Thereafter, the control unit 300 transmits state information of the at least one corresponding satellite to the satellite receiver 220 through the second interface 320 in order to confirm or contradict the erroneous state. (If the erroneous state is contradicted, the satellite receiver may lift a restriction on the use of signals from the at least one satellite under consideration for positioning estimation.)

It is noted, in the above-described embodiment, the monitoring server 230 includes the first interface 310 for communicating with the satellite control center 200 and the second interface 320 for communicating with the satellite receiver 220. However, in an alternative embodiment, the monitoring server 230 may use a single interface to communicate with the satellite control center 200 and the satellite receiver 220.

Figure 4:
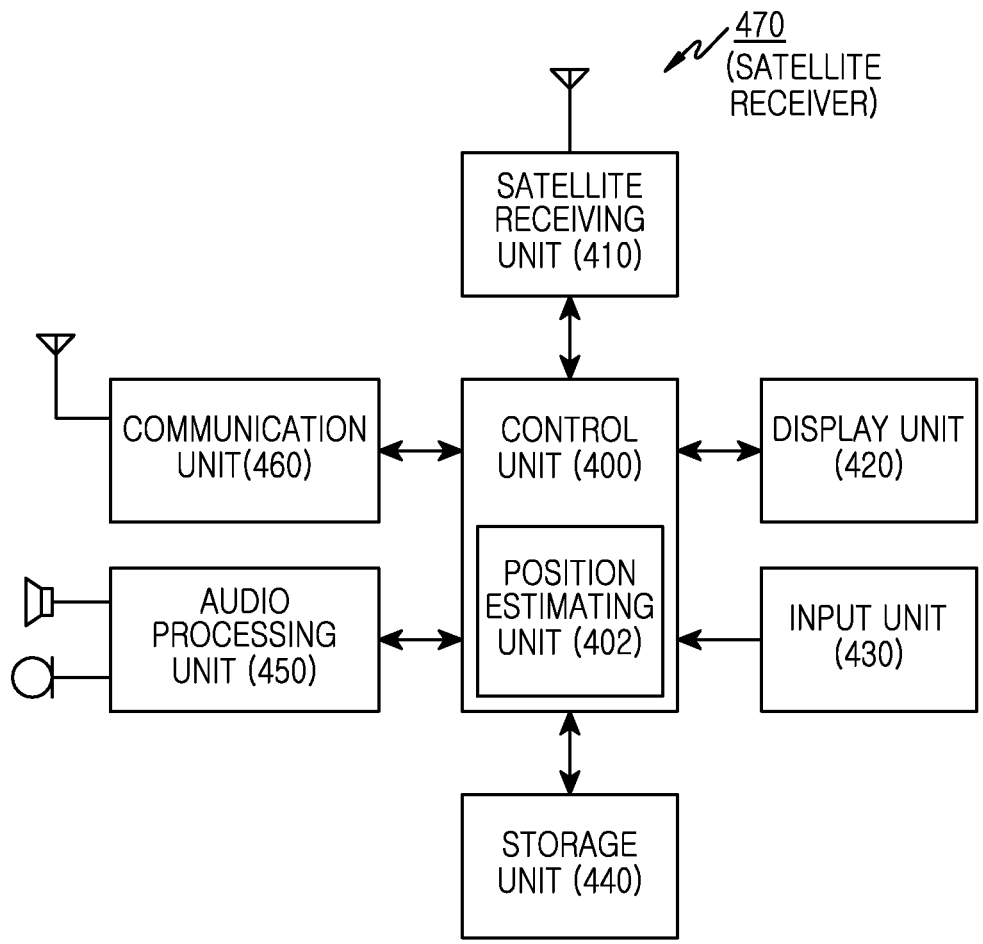
FIG. 4 is a diagram illustrating a block configuration of a satellite receiver for identifying a satellite state according to the present invention.

FIG. 4 illustrates a block configuration of a satellite receiver for identifying a satellite state according to an embodiment.

Satellite receiver 470 (an embodiment of satellite receiver 220) includes a control unit 400, a satellite receiving unit 410, a display unit 420, an input unit 430, a storage unit 440, an audio processing unit 450, and a communication unit 460.

The control unit 400 controls an overall operation of the satellite receiver 470.

The satellite receiving unit 410 receives a satellite signal from at least one satellite. The satellite signal is provided to control unit 400 along with any satellite state information contained therein.

When detecting an erroneous satellite, the control unit 400 controls a position estimating unit 402 to refrain from using a satellite signal of the erroneous satellite. For example, the control unit 400 identifies an erroneous satellite through satellite state information received from the monitoring server 230. As another example, the control unit 400 may identify whether an error has occurred in the satellite 210, through satellite state information received from the satellite 210. In this case, the control unit 400 may additionally identify whether an error has occurred in the satellite 210, through the monitoring server 230. (If the monitoring server 230 contradicts the existence of an erroneous state, then either further investigative measure can be taken by the satellite receiver, or the satellite receiver will re-designate the satellite as healthy.) As yet another example, the control unit 400 may use a RAIM (Receiver Autonomous Integrity Monitoring) scheme to identify a satellite that is suspected to have an error (described below).

The position estimating unit 402 estimates the position of the satellite receiver 470 by using a satellite signal of at least one satellite received from the satellite receiving unit 410. In this case, under the control of the control unit 400, the position estimating unit 402 does not use a satellite signal received from an erroneous satellite, for position estimation.

Under the control of the control unit 400, the display unit 420 displays status information of the satellite receiver 470, characters input by a user, moving pictures, still pictures, and the like. If the display unit 420 includes a touchscreen, the display unit 420 provides the control unit 400 with input data received through the touchscreen.

The input unit 430 provides the control unit 400 with input data generated by user selection. For example, the input unit 430 may minimally include only a control button for control of the satellite receiver 470. Input unit 430 may include a keypad for receiving input data from the user.

The storage unit 440 may include a program storage unit for storing a program for controlling an operation of the satellite receiver 470, and a data storage unit for storing data generated during the execution of a program.

The audio processing unit 450 controls the input/output of audio signals. For example, the audio processing unit 450 outputs an audio signal received from the control unit 400 to the exterior through a speaker, and provides an audio signal received from a microphone to the control unit 400.

The communication unit 460 processes signals transmitted/received through an antenna. For example, the communication unit 460 processes signals communicated between the satellite receiver 470 and the monitoring server 230.

Hereinafter, an exemplary method for transmitting satellite state information according to a satellite state change will be described.

Figure 5:
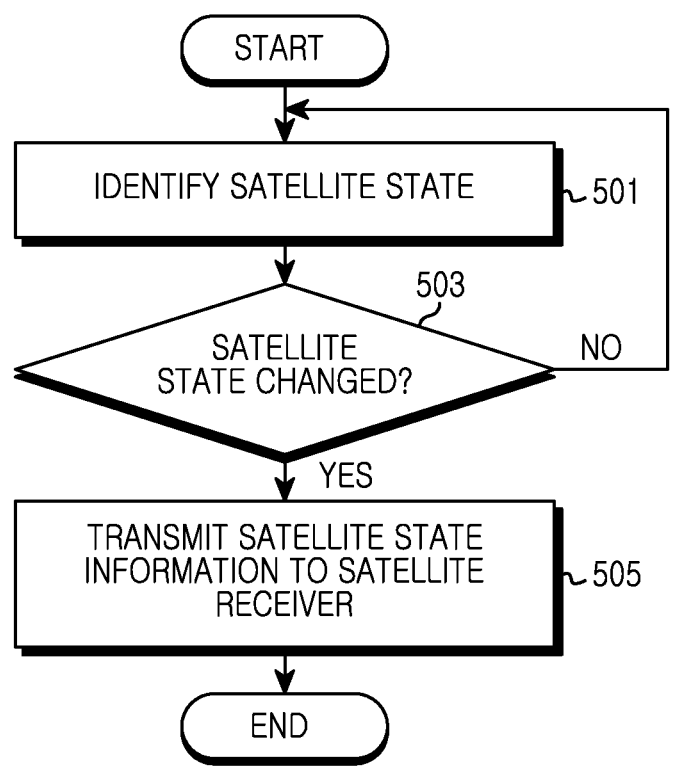
FIG. 5 is a diagram illustrating a process for transmitting satellite state change information in the monitoring server according to an exemplary embodiment of the present invention.

FIG. 5 illustrates a process for transmitting satellite state change information in the monitoring server 230 according to an exemplary embodiment of the present invention.

At step 501, the monitoring server identifies a satellite state from state information received from the satellite control center using one of the techniques described above. For example, the monitoring server identifies a satellite state of at least one satellite by monitoring satellite state information that is periodically posted by the satellite control center. As another example, the monitoring server may receive satellite state information that is periodically transmitted by the satellite control center. As yet another example, the monitoring server may periodically request and receive satellite state information from the satellite control center.

Next, in step 503, the monitoring server determines whether the satellite state changes. For example, based on the monitored satellite state information, the monitoring server determines whether the erroneous satellite state changes into a normal state, or whether an error occurs in a normal satellite.

When the satellite state does not change, the monitoring server returns to step 501 to identify a satellite state again. When the satellite state does change, the monitoring server transmits satellite state information to the satellite receiver (step 505). For example, the monitoring server transmits extended ephemeris data including the satellite state information to the satellite receiver. Such extended ephemeris data serves to increase the satellite ephemeris information extraction efficiency of the satellite receiver, and includes predictive information about a satellite ephemeris that that will occur in the future.

Figure 6:
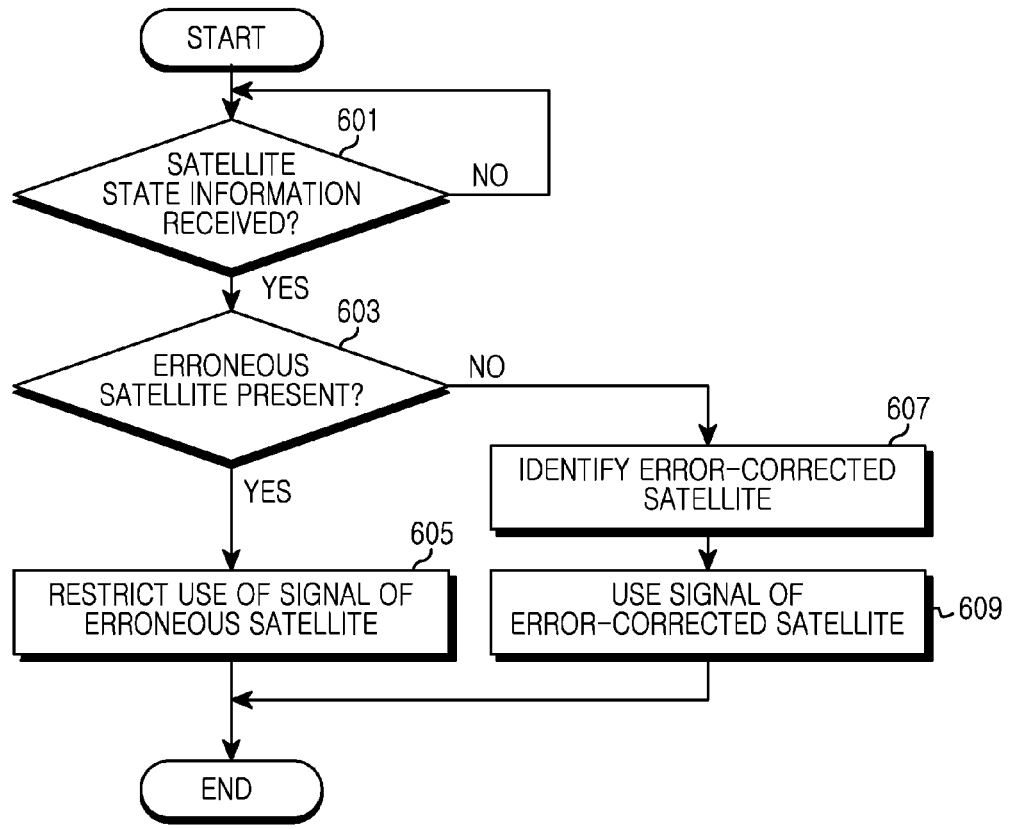
FIG. 6 is a diagram illustrating a process for identifying satellite state change information in the satellite receiver according to an exemplary embodiment of the present invention.

FIG. 6 illustrates a process for identifying satellite state change information in the satellite receiver according to an exemplary embodiment of the present invention. This process can be carried out if the monitoring server transmits satellite state information to the satellite receiver only when a satellite state changes, as described above.

The satellite receiver first determines whether satellite state information is received from the monitoring server (step 601). If so, at step 603 the satellite receiver determines, based on the satellite state information, whether an erroneous satellite is present, i.e., whether the state of a satellite has changed from normal to erroneous ("unhealthy").

When an erroneous satellite is present, the satellite receiver proceeds to step 605. In step 605, the satellite receiver restricts the use of a satellite signal received from the erroneous satellite. Preferably, according to the restriction, the satellite receiver does not use a satellite signal received from the erroneous satellite for position estimation. Alternatively, the signal from the erroneous satellite is given less weight than those from other (e.g., normal) satellites.

On the other hand, when an erroneous satellite is not present, meaning that the satellite state change indicates a change from erroneous to normal (error-corrected), step 607 is performed. That is, the satellite receiver identifies an error-corrected satellite based on the satellite state information.

In step 609, the satellite receiver performs position estimation by using a satellite signal received from the error-corrected satellite. For example, the satellite receiver releases the prior restriction on the use of that error-corrected satellite, and performs position estimation by using a satellite signal received from the satellite.

In the above-described embodiment, the monitoring server transmits satellite state information to the satellite receiver only when a satellite state changes. However, in other embodiments, the monitoring server periodically transmits satellite state information to the satellite receiver.

Figure 7:
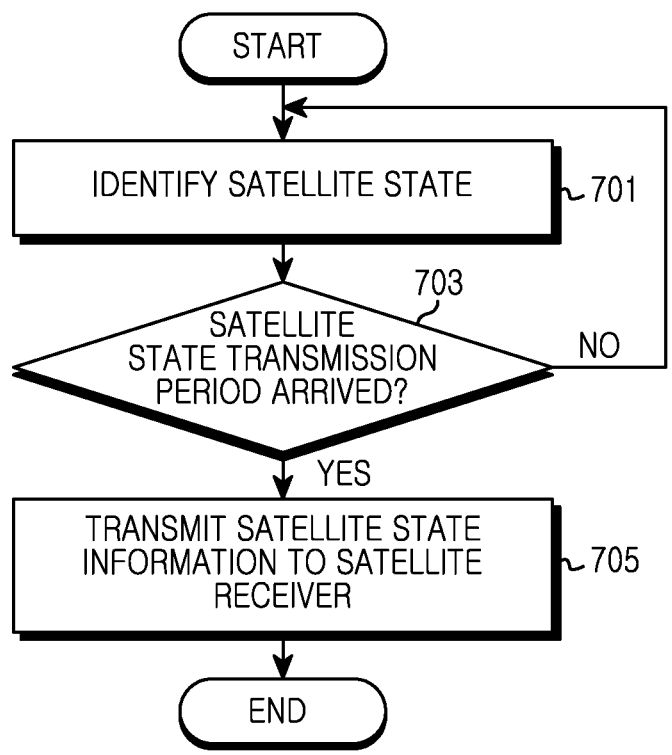
FIG. 7 is a diagram illustrating a process for periodically transmitting satellite state information in the monitoring server according to an exemplary embodiment of the present invention.

FIG. 7 illustrates a process for periodically transmitting satellite state information in the monitoring server according to an exemplary embodiment of the present invention.

The monitoring server first identifies a satellite state of at least one satellite (step 701) using any of the techniques described above (periodically receiving the satellite states from the satellite control center, etc.). For example, the monitoring server identifies a satellite state of at least one satellite by monitoring satellite state information that is periodically posted by the satellite control center. As another example, the monitoring server may receive satellite state information that is periodically transmitted by the satellite control center. As yet another example, the monitoring server may periodically request and receive satellite state information from the satellite control center.

Next, the monitoring server determines whether a satellite state transmission period arrives (step 703), which is a period during which the received satellite states are to be transmitted to the satellite receiver.

When the satellite state transmission period does not arrive, the monitoring server returns to step 701 to identify a satellite state again. Note that the periodic interval for transmitting the satellite states from the satellite control center to the monitoring server can be set as the same or different from the periodic interval for re-transmitting the satellite states from the monitoring server to the satellite receiver.

When the satellite state transmission period arrives, the monitoring server proceeds to step 705. In step 705, the monitoring server transmits satellite state information to the satellite receiver. For example, the monitoring server transmits extended ephemeris data including the satellite state information to the satellite receiver.

Figure 8:
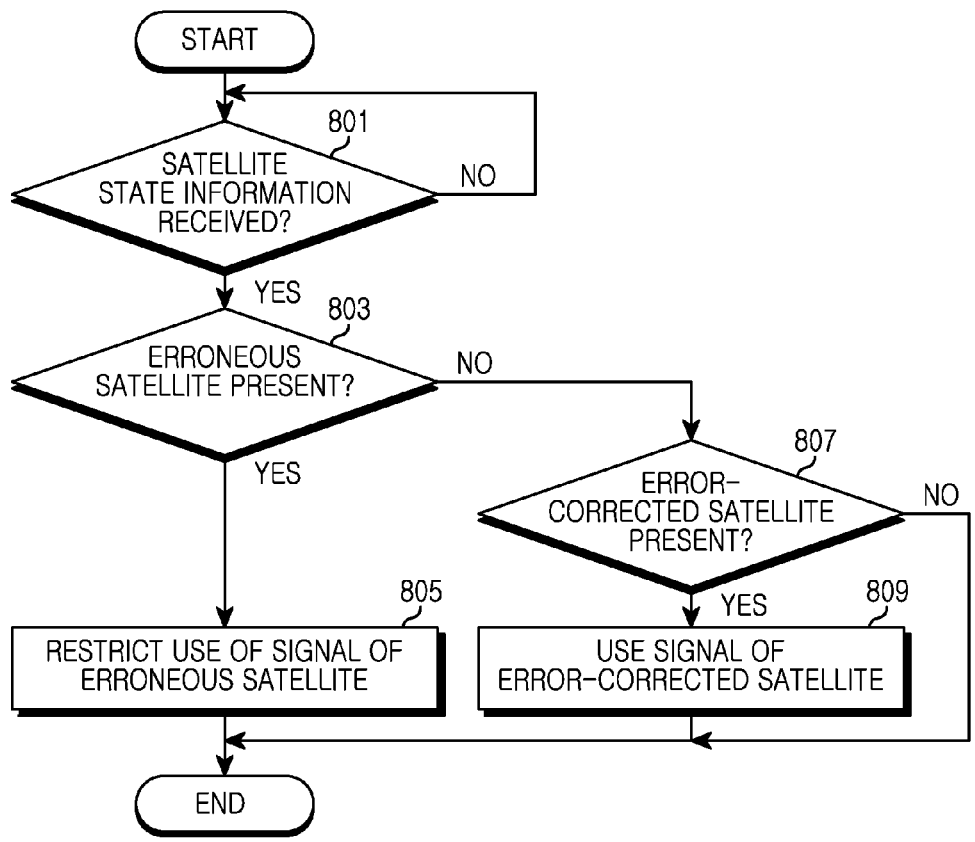
FIG. 8 is a diagram illustrating a process for periodically identifying satellite state information in the satellite receiver according to an exemplary embodiment of the present invention.

FIG. 8 illustrates a process for periodically identifying satellite state information in the satellite receiver according to an exemplary embodiment of the present invention. This process can be carried out when the monitoring server periodically transmits the satellite state information, as described above.

Referring to FIG. 8, in step 801, the satellite receiver determines whether satellite state information is received from at least one of the monitoring server and the satellite using any of the mechanisms described earlier.

When the satellite state information is received, the satellite receiver proceeds to step 803. Here, based on the satellite state information, the satellite receiver determines whether an erroneous satellite is present. For example, based on the satellite state information received from the satellite, the satellite receiver determines whether an erroneous satellite is present. As another example, based on the satellite state information received from the monitoring server, the satellite receiver may determine whether an erroneous satellite is present. As yet another example, when identifying an erroneous satellite through satellite state information received from the satellite, the satellite receiver may identify state information of the erroneous satellite through the monitoring server.

When an erroneous satellite is present, the satellite receiver restricts the use of a satellite signal received from the erroneous satellite (step 805). That is, the satellite receiver preferably does not use a satellite signal received from the erroneous satellite for position estimation.

On the other hand, when an erroneous satellite is not present, the satellite receiver determines whether an error-corrected satellite is present (step 807), i.e., a satellite that was previously considered erroneous is now error-corrected (no longer erroneous)

When an error-corrected satellite is not present, the satellite receiver recognizes that a satellite with satellite state information changed is not present. Thereafter, the satellite receiver ends the present algorithm.

On the other hand, when an error-corrected satellite is present, the satellite receiver proceeds to step 809. In step 809, the satellite receiver performs position estimation by using a satellite signal received from the error-corrected satellite. Thus the satellite receiver releases the restriction on the use of an error-correction satellite, and performs position estimation by using a satellite signal received from the error-corrected satellite.

In the above-described embodiment, the satellite receiver receives satellite state information from the monitoring server periodically or when a satellite state changes. In another exemplary embodiment, the satellite receiver requests satellite state information from the monitoring server, as illustrated in FIG. 9.

Figure 9:
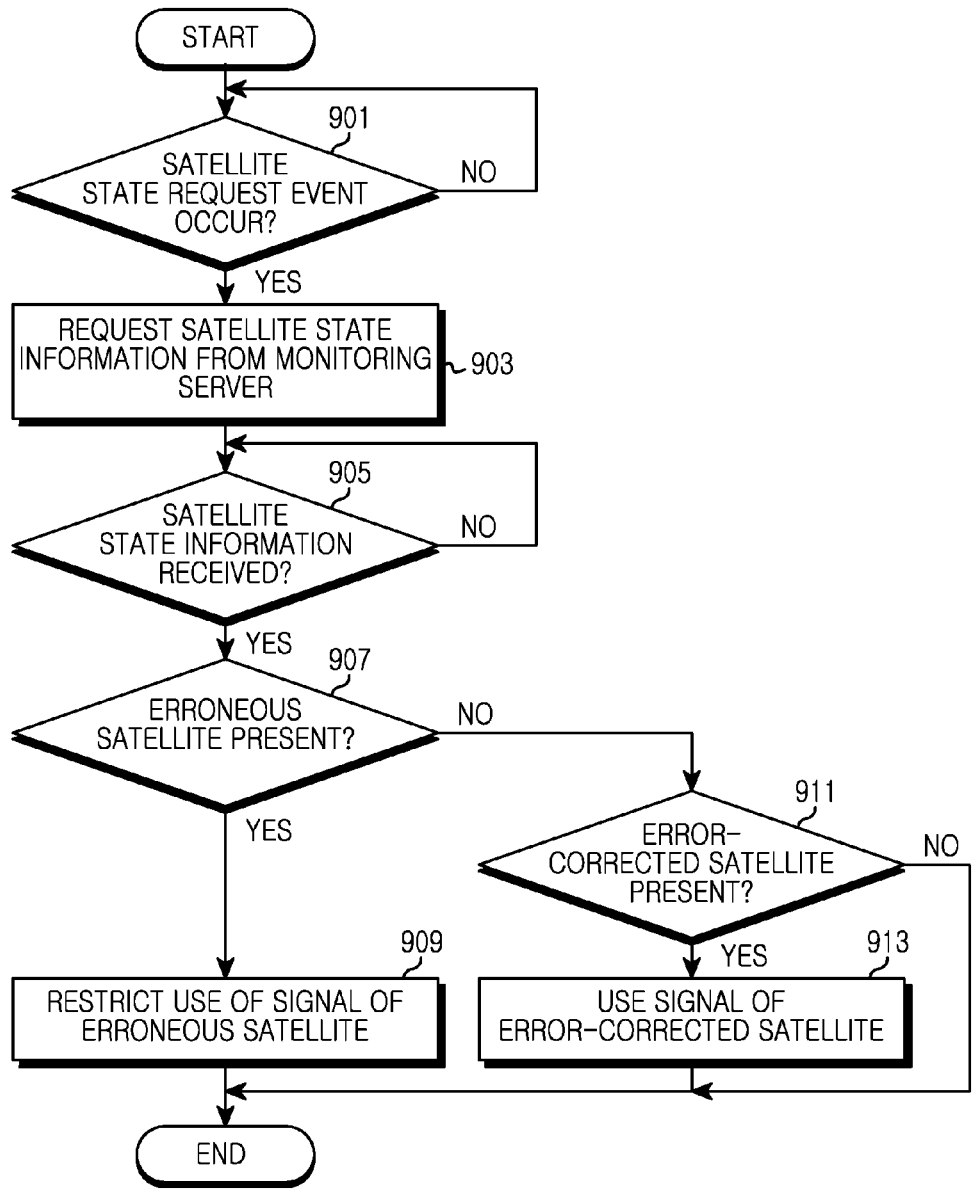
FIG. 9 is a diagram illustrating a process for requesting satellite state information in the satellite receiver according to an exemplary embodiment of the present invention.

FIG. 9 illustrates a process for requesting satellite state information in the satellite receiver according to an exemplary embodiment of the present invention. The satellite receiver first determines (step 901) whether a "satellite state request event" (hereafter, "request event") occurs. This request event may occur when the satellite receiver determines that satellite use is initialized, e.g., when an application requiring positioning information is launched. As another example triggering the request event, the satellite receiver may determine whether a satellite state request period arrives. This request period is a periodic time interval in which the satellite receiver initiates the request for state information to the monitoring server. In a further example of a request event, the satellite receiver determines whether it has become communicatively connected to a wireless LAN. When connected to a wireless LAN, the satellite receiver recognizes that a satellite state request event has occurred. This is because the satellite receiver intends to receive satellite state information via the wireless LAN instead from a monitoring server. In another example of a request event, the satellite receiver determines whether an available time of extended ephemeris data expires. Extended ephemeris data is provided during a predetermined time interval to the satellite receiver via a signal from the satellite and/or the monitoring server. When an available time of extended ephemeris data expires, the satellite receiver recognizes that a satellite state request event has occurred.

When a satellite state request event has occurred, the satellite receiver requests satellite state information from the monitoring server (step 903). Next, the satellite receiver determines whether satellite state information is received from the monitoring server (step 905). For example, the satellite receiver determines whether extended ephemeris data including satellite state information is received from the monitoring server.

When the satellite state information is received, the satellite receiver proceeds to step 907. In step 907, based on the satellite state information, the satellite receiver determines whether an erroneous satellite is present.

If so, the satellite receiver restricts the use of a satellite signal received from the erroneous satellite (step 909).

When an erroneous satellite is not present, the satellite receiver determines whether an error-corrected satellite is present (step 911), i.e., whether the state of a previously designated erroneous satellite has changed to an error-corrected state.

When an error-corrected satellite is present, the satellite receiver performs position estimation by using a satellite signal received from the error-corrected satellite (step 913). For example, the satellite receiver releases the restriction on the use of an error-correction satellite, and performs position estimation by using a satellite signal received from the error-corrected satellite.

Figure 10:
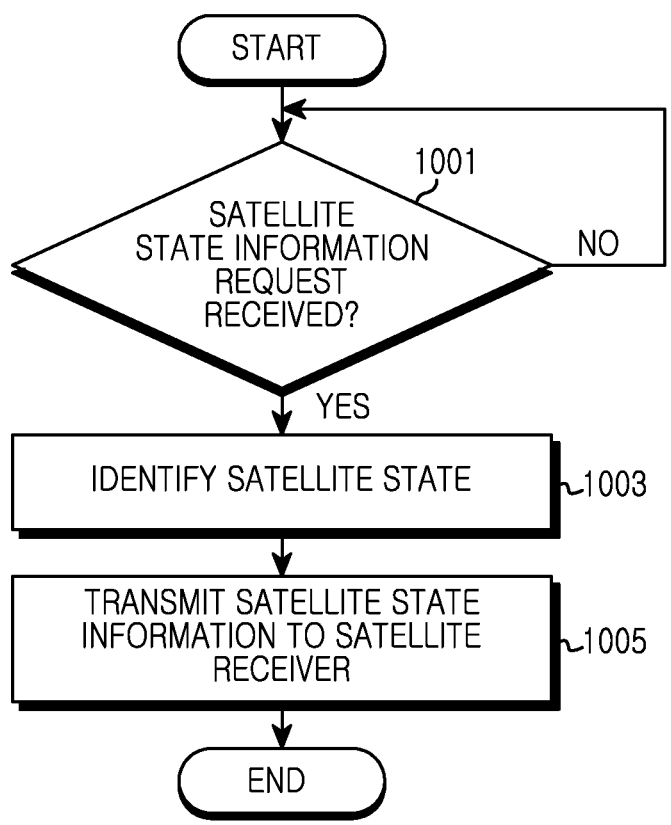
FIG. 10 is a diagram illustrating a process for transmitting satellite state information in the monitoring server at the request of the satellite receiver according to an exemplary embodiment of the present invention.

FIG. 10 illustrates a process for transmitting satellite state information in the monitoring server according to an exemplary embodiment of the present invention. This process is implementable when the satellite receiver is operative to request the satellite state information as described above.

Referring to FIG. 10, in step 1001, the monitoring server determines whether a satellite state information request signal is received from the satellite receiver.

When a satellite state information request signal is received from the satellite receiver, the monitoring server proceeds to step 1003. In step 1003, the monitoring server identifies a satellite state from signals received from the satellite control center as described above. For example, the monitoring server identifies satellite state information that is periodically posted by the satellite control center. As yet another example, the monitoring server may periodically request and receive satellite state information from the satellite control center.

In step 1005, the monitoring server transmits satellite state information to the satellite receiver. For example, the monitoring server transmits extended ephemeris data including the satellite state information to the satellite receiver.

Figure 11:
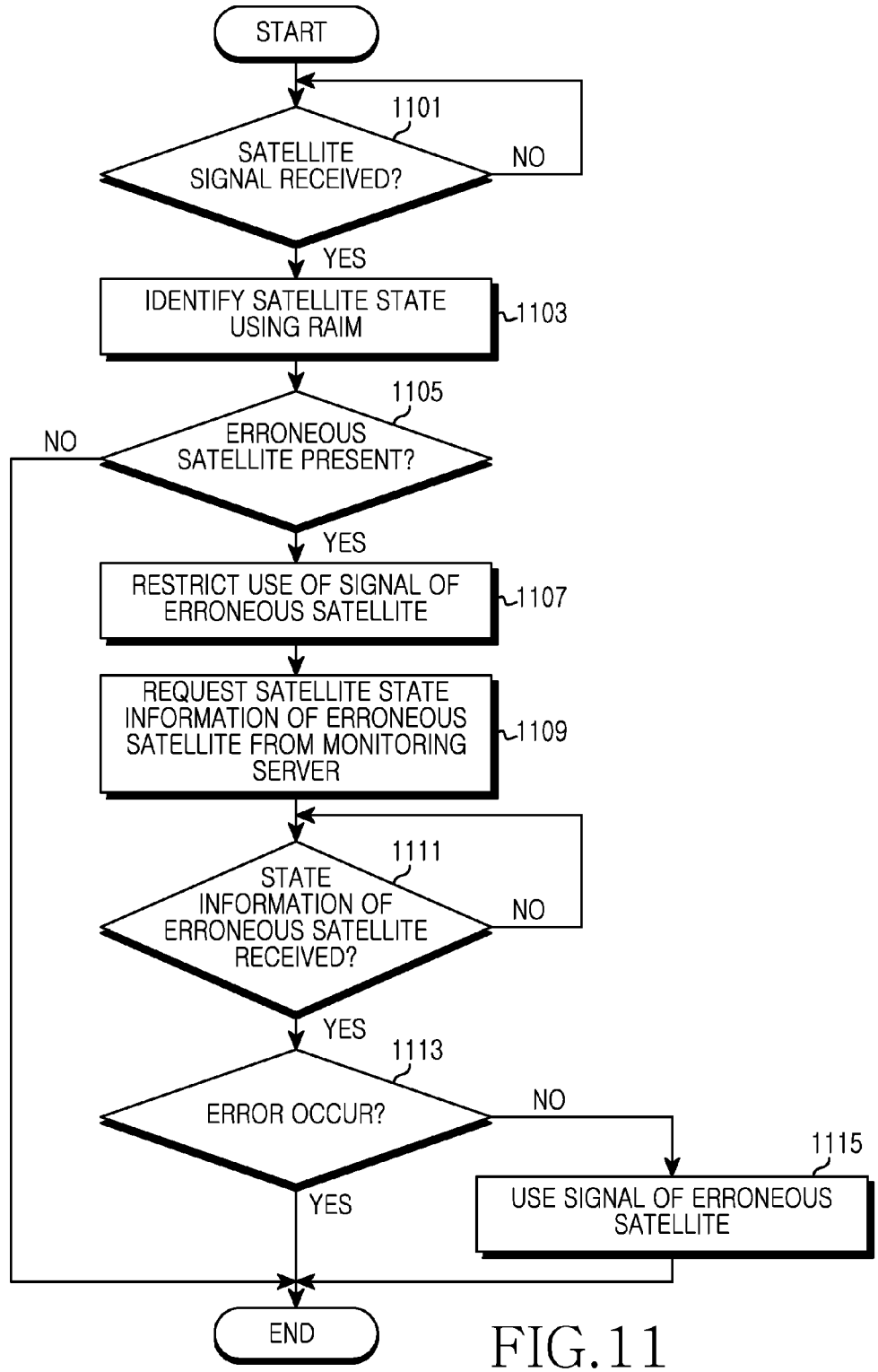
FIG. 11 is a diagram illustrating a process for identifying satellite state information through RAIM in the satellite receiver according to an exemplary embodiment of the present invention.

FIG. 11 illustrates a process for identifying satellite state information through RAIM in the satellite receiver according to an exemplary embodiment of the present invention. This process involves the satellite receiver estimating a satellite state.

Referring to FIG. 11, in step 1101, when a satellite signal is received, the satellite receiver identifies a satellite state by using the satellite signal (step 1103). For example, the satellite receiver uses a RAIM scheme to determine whether there is a satellite that is suspected to have an error. Specifically, the satellite receiver uses the satellite signal to estimate the position of the satellite that has transmitted the satellite signal.

Thereafter, the satellite receiver identifies an error occurrence probability of the satellite by comparing the estimated satellite position with predictive information of the satellite included in extended ephemeris information previously obtained. That is, when a difference between the estimated satellite position and the predictive information of the satellite included in the extended ephemeris information is greater than a reference value, the satellite receiver recognizes that the satellite has an error occurrence possibility.

In step 1105, the satellite receiver determines whether an erroneous satellite is present based on the RAIM scheme. Here, the erroneous satellite is a satellite that has an error occurrence possibility.

When determined that an erroneous satellite is not present, the satellite receiver ends the present algorithm. In this case, although not illustrated, the satellite receiver may thereafter identify a satellite state by using the satellite state information received from the monitoring server as illustrated in any one of FIGS. 6, 8 and 9.

On the other hand, when an erroneous satellite is determined to be present based on the RAIM scheme, the satellite receiver proceeds to step 1107. In step 1107, the satellite receiver restricts the use of a satellite signal received from the erroneous satellite. That is, the satellite receiver preferably does not use a satellite signal received from the erroneous satellite for position estimation.

Also, when an erroneous satellite is present, the satellite receiver proceeds to step 1109. Here, the satellite receiver requests satellite state information about the erroneous satellite from the monitoring server. The satellite receiver next determines whether this satellite state information is received (step 1111). For example, the satellite receiver determines whether extended ephemeris data including the satellite state information about the erroneous satellite is received from the monitoring server.

When the satellite state information about the erroneous satellite is received, the satellite receiver determines whether the monitoring server confirms that an error has occurred in the erroneous satellite (step 1113). If so, the satellite receiver ends the present algorithm. That is, the satellite receiver maintains the restriction of the use of a satellite signal received from the erroneous satellite On the other hand, when the monitoring server contradicts the state of the satellite under consideration ("the studied satellite") as erroneous, the satellite receiver proceeds to step 1115. Here, the satellite receiver performs position estimation by using a satellite signal received from the studied satellite, which may still be a RAIM-determined erroneous satellite. Accordingly, when identifying the normal operation of the studied satellite, the satellite receiver releases the restriction on the use of this satellite.

As described above, when the satellite receiver requests satellite state information about a RAIM-determined erroneous satellite, the monitoring server identifies a satellite state of the satellite and transmits the satellite state information to the satellite receiver, in a manner as illustrated previously in FIG. 10.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As described above, according to the present invention, the satellite navigation system uses a separate satellite state monitoring server to transmit satellite state information to the satellite receiver, whereby a delay in identifying the satellite state information by the satellite receiver can be reduced. Accordingly, it is possible to reduce a position estimation error of the satellite receiver that may be caused by an erroneous satellite.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method operative in a satellite receiver, comprising:
 receiving first satellite state information from at least one satellite;
 identifying an erroneous satellite based on the first satellite state information, and restricting the use of a satellite signal received from the identified erroneous satellite;
 receiving second satellite state information from a server;
 updating a satellite state of the at least one satellite using the second satellite state information; and
 when the updated satellite state contradicts an erroneous state of the identified satellite, lifting the restriction on the use of the signal from the identified satellite.

2. The method of claim 1, wherein receiving the second satellite state information includes:
 receiving extended ephemeris data from the server; and
 identifying the second satellite state information included in the extended ephemeris data.

3. The method of claim 1, further comprising: prior to receiving the second satellite state information from the server, determining whether a satellite state request event occurs; if so, transmitting a request for satellite state information to the server; and if the request is transmitted, the second satellite state information is received in response to the request.

4. The method of claim 3, wherein determining whether the satellite state request event occurs is based on at least one of a satellite signal utilization, validity/invalidity of extended ephemeris data, a satellite state information request period, and a connection/non-connection of the satellite receiver to a wireless LAN.

5. A satellite receiver comprising:
 a satellite receiving unit configured to receive a satellite signal;
 a communication unit configured to communicate with a server; and
 a control unit configured to:
  receive first satellite state information from at least one satellite through the satellite receiving unit;
  identify an erroneous satellite based on the first satellite state information, and restrict the use of a satellite signal received from the identified erroneous satellite;
  receive second satellite state information from a server through the communication unit;
  update a satellite state of the at least one satellite using the second satellite state information;
  when the updated satellite state contradicts an erroneous state of the identified satellite, lift the restriction on the use of the signal from the identified satellite.

6. The satellite receiver of claim 5, wherein the control unit is configured to identify second satellite state information included in extended ephemeris data received from the server through the communication unit.

7. The satellite receiver of claim 5, wherein before receiving the satellite state information from the server, when a satellite state request event occurs, the control unit is further configured to transmit a request for satellite state information to the server through the communication unit; and if the request is transmitted, the second satellite state information is received in response to the request.

8. The satellite receiver of claim 7,
 wherein the control unit is configured to determine whether the satellite state request event occurs based on at least one of a satellite signal utilization, validity/invalidity of extended ephemeris data, a satellite state information request period, and a connection/non-connection of the satellite receiver to a wireless LAN.

* * * * *